(12) United States Patent
Zhao et al.

(10) Patent No.: US 11,752,677 B2
(45) Date of Patent: Sep. 12, 2023

(54) METHOD FOR ON-LINE MEASUREMENT OF POLYMER MELT TEMPERATURE AND APPARATUS THEREOF

(71) Applicant: Zhejiang University, Zhejiang Province (CN)

(72) Inventors: Peng Zhao, Zhejiang Province (CN); Jianfeng Zhang, Zhejiang Province (CN); Kaipeng Ji, Zhejiang Province (CN); Zhengyang Dong, Zhejiang Province (CN); Neng Xia, Zhejiang Province (CN); Hongwei Zhou, Zhejiang Province (CN); Jianzhong Fu, Zhejiang Province (CN)

(73) Assignee: ZHEJIANG UNIVERSITY, Zhejiang Province (CN)

( * ) Notice: Subject to any disclaimer, the term of this patent is extended or adjusted under 35 U.S.C. 154(b) by 223 days.

(21) Appl. No.: 17/226,418

(22) Filed: Apr. 9, 2021

(65) Prior Publication Data
US 2021/0316489 A1    Oct. 14, 2021

(30) Foreign Application Priority Data
Apr. 9, 2020    (CN) .......................... 202010276363.3

(51) Int. Cl.
*B29C 45/78*    (2006.01)
*G01K 13/02*    (2021.01)
(Continued)

(52) U.S. Cl.
CPC .............. *B29C 45/78* (2013.01); *G01K 11/24* (2013.01); *G01K 13/026* (2021.01);
(Continued)

(58) Field of Classification Search
CPC .... B29C 2945/7604; B29C 2945/7626; B29C 2945/76474; B29C 45/78;
(Continued)

(56) References Cited

U.S. PATENT DOCUMENTS 5,942,169 A * 8/1999 Narazaki ............. B29C 45/7693
425/170

OTHER PUBLICATIONS

Wang, Kejian, Method and device for measuring compression coefficient and expansion coefficient of material on line, Jan. 8, 2014, English translation of CN103499642A.*

* cited by examiner

*Primary Examiner* — George R Koch
(74) *Attorney, Agent, or Firm* — TAROLLI, SUNDHEIM, COVELL & TUMMINO L.L.P.

(57) ABSTRACT

The present disclosure discloses a method for on-line measurement of the polymer melt temperature, comprising: on-line measurement of ultrasonic sound velocity c of melt in an injection molding process, on-line measurement of melt pressure P in the injection molding process, and obtaining melt temperature T in the injection molding process by formula (1). The present disclosure also discloses an apparatus for on-line measurement of the polymer melt temperature. The method and the apparatus provided in the present disclosure may enable on-line and in-situ characterization of the melt density and further enable on-line quantitative measurement of the melt quality. Compared with infrared measurement methods, the method provided herein is significantly reduced in cost, which is of great significance to theoretical researches of crystallization process and shear heating.

6 Claims, 4 Drawing Sheets

(51) Int. Cl.
*G01K 11/24* (2006.01)
*G01N 29/024* (2006.01)

(52) U.S. Cl.
CPC .............. *B29C 2945/7604* (2013.01); *B29C 2945/76474* (2013.01); *G01N 29/024* (2013.01); *G01N 2291/02818* (2013.01); *G01N 2291/02881* (2013.01)

(58) Field of Classification Search
CPC ..... G01N 2291/011; G01N 2291/0252; G01N 2291/02818; G01N 2291/02881; G01N 29/024; G01N 29/228; G01K 11/24; G01K 13/026
See application file for complete search history.

METHOD FOR ON-LINE MEASUREMENT OF POLYMER MELT TEMPERATURE AND APPARATUS THEREOF

TECHNICAL FIELD

The present disclosure belongs to the technical field of ultrasonic testing and material molding, and relates to a method for on-line measurement of a polymer melt temperature and an apparatus thereof.

BACKGROUND

Injection molding is the most widely used means to produce high-performance polymer products, and it is a typical batch process of dynamic complexity. Across the injection molding process, a polymer undergoes tremendous pressure and temperature variations from high temperatures and high pressures to normal temperatures and pressures, which is a complex thermodynamic process. In this process, the evolution of meso-morphological structures and macrophysical properties of the melt is related to thermodynamic properties of the final product. Therefore, it is a significant basis for regulating product performance that we understand and obtain the evolution process information of melt physical properties and meso-structures in the molding process. The injection molding process is a typical thermodynamic process, and has the melt temperature and pressure as its most important variables. While pressure measurement has been becoming mature, as limited by the temperature measurement principle, accurate measurement of melt temperature has always been a great problem.

Traditional thermocouple is a contact temperature measurement method involving temperature conduction, which is difficult to characterize rapid temperature variations during injection molding due to its slow response speed. Moreover, it can only measure the temperature of mold surface or melt surface. When using the thermocouple to measure the melt temperature in the mold, the method obtains a result far from the actual melt temperature variation. Infrared optic-fiber temperature sensor, the most accurate sensor for in-mold temperature measurement at present, is seriously limited in application due to its high price. In addition, some scholars have researched ultrasonic measurement methods of melt temperature. Some soft measurement methods were proposed based on linear regression of data, but there is no effective quantitative measurement method.

SUMMARY

The present disclosure aims at proposing a method, combining mold cavity pressure information with ultrasonic signals, for on-line measurement of melt temperature in the injection molding process, which measures the pressure and sound velocity of polymer melt in the molding process on-line through an ultrasonic probe and a pressure sensor, and calculates the real-time melt temperature variation through model derivation and calculation, so as to enable monitoring and diagnosis of the molding process.

A method for on-line measurement of a polymer melt temperature includes: measurement of ultrasonic sound velocity c of melt during injection molding, measurement of melt pressure P during injection molding, and obtaining melt temperature T during injection molding by a formula as follows:

$$P = c^2(f(T, P) - f(T, P_0)) \quad (1)$$

Wherein $f(T, P)$ and $(T, P_0)$ are respectively:

$$f(T, P) = \frac{1}{[b_{1m} + b_{2m}(T - b_5)]\left\{1 - C\ln\left[1 + \frac{P}{b_{3m}e^{[-b_{4m}(T - b_5)]}}\right]\right\}}$$

$$f(T, P_0) = \frac{1}{[b_{1m} + b_{2m}(T - b_5)]\left\{1 - C\ln\left[1 + \frac{P}{b_{3m}e^{[-b_{4m}(T - b_5)]}}\right]\right\}}$$

Wherein: $P_0$ is 1 standard atmospheric pressure, while C, $b_{1m}$, $b_{2m}$, $b_{3m}$, $b_{4m}$, and $b_5$ are constant coefficients.

During the calculation, P, c, and $P_0$ are all known numbers, and theoretically f(T, P) and f(T, $P_0$) may be substituted into equation (1) to enable real-time measurement of the melt temperature through the solution of equation (1). As such, the problem turns into the solution of an equation with one unknown quantity as follows:

$$g(T) = P - c^2(f(T,P) - f(T,P_0)) = 0 \quad (2)$$

Formula (2) is a complex equation without analytical solution, so it needs a certain numerical calculation method in order to obtain the result of the temperature T. A Newtonian-iterative numerical method is adopted in the present disclosure, wherein an iterative calculation process is as follows:

$$T_{n+1} = T_n - \frac{g(T_n)}{g'(T_n)} \quad (2')$$

Given an initial $T_0$, according to the above iterative formula, many times of iterations result in $T_n$ which may be regarded as the solution of the equation, i.e., the calculated melt temperature. Because the Newtonian-iterative method has high convergence efficiency, the number of iteration times is preferably set to 4-10, and more preferably set to 5 times. $T_5$ obtained by iterative solution is regarded as the temperature value obtained by measurement and calculation, thus enabling the measurement of melt temperature in the molding process.

Preferably, a non-contact ultrasonic probe is used to enable the on-line measurement of the ultrasonic sound velocity c; and the pressure sensor is used to enable the on-line measurement of the pressure P. The ultrasonic sound velocity c and the pressure P are measured by an ultrasonic probe and a pressure sensor arranged at a same cross section of the melt.

For the actual mounting, the ultrasonic probe fits and contacts the surface to be measured of the front mold by using the couplant, and the other end of the probe is pressed tightly against and fixed onto the inside of the mold by mechanical means such as a spring. Preferably, it is suggested to select a high-temperature ultrasonic couplant as the couplant, so as to improve the coupling efficiency of the probe and increase the effective duration of coupling. The pressure sensor is mounted into the mounting hole on the rear mold to measure a surface coplanar with a cavity surface. Preferably, the ultrasonic probe and the pressure sensor are arranged at a same cross section of the melt.

The ultrasonic probe is connected with ultrasonic signal generation and acquisition equipment through cables. This equipment should be capable of waveform modulation, echo acquisition, display and continuous recording of ultrasonic signals, and may finish continuous acquisition of ultrasonic signals in a certain period of time. Preferably, the sampling frequency of the equipment is higher than 250 MHz. During the experiment, the signal preservation rate is 100 Sa/s, which means 100 echo waveforms are preserved per second. Preferably, the signal preservation rate is higher than 20 Sa/s. The pressure sensor is connected with a data acquisition system, and the sampling frequency of pressure signals is consistent with that of ultrasonic. The experimental measurement starts after successful debugging of the equipment.

At the beginning of a certain cycle in the injection molding process, the equipment starts sampling, and at the end of the process, the signal acquisition completes, and the signals are saved and transmitted to the computing device for extracting real-time variations of the pressure P and the sound velocity c in the process; a pressure and a sound velocity at a same moment are extracted and put into calculation, according to a measurement model derived by the present disclosure, to obtain the melt temperature T in the real-time process.

The present disclosure also provides an apparatus of on-line measurement of melt temperature subjected to an injection molding process on the basis of ultrasonic sound velocity and melt pressure, or the present disclosure provides an apparatus of on-line measurement of a polymer melt temperature, including:

An ultrasonic probe, used for on-line measurement of ultrasonic sound velocity c of melt during the injection molding process;

A pressure sensor, used for on-line measurement of melt pressure P during the injection molding process; and A data processing unit, used for receiving signals from the ultrasonic probe and the pressure sensor to output numeral values of the ultrasonic sound velocity c and the pressure P, and using formula (1) according to claim 1 to obtain a temperature of the melt subjected to the injection molding process or the polymer melt.

The data processing unit may adopt a microprocessor, an industrial computer, a control chip or an integrated circuit board.

Preferably, the ultrasonic probe and the pressure sensor are arranged at a same cross section of the melt during mounting.

Preferably, a plurality of sets of ultrasonic probes and pressure sensors are arranged along the direction that the melt flows in, so as to measure melt temperature distribution across the cavity on line. By the method provided in the present disclosure, when a plurality of sets of ultrasonic probes and pressure sensors are arranged inside the mold cavity, it is able to measure the melt temperature distribution across the cavity on line.

Preferably, the ultrasonic probe fits and contacts a surface to be measured of the front mold by using the couplant, and the other end of the ultrasonic probe is pressed tightly against and fixed onto the inside of the mold; and the pressure sensor is mounted into the mounting hole on the rear mold to measure a surface coplanar with a cavity surface.

Preferably, a high-temperature ultrasonic couplant is selected as the couplant.

According to the method, an ultrasonic probe and a pressure sensor are respectively arranged on the front and rear sides of the injection molding cavity, so as to enable synchronous on-line measurement of the melt sound velocity and pressure at a certain local position in the molding process. Combining the sound velocity equation, volume modulus equation and PVT equation of the melt, we may deduce the correlation among melt pressure, sound velocity and temperature, thereby obtaining the sound velocity and pressure through measurement and enabling the measurement of the melt temperature in the molding process. When collecting signals continuously in one cycle of the molding process, we may obtain a variation curve of the melt temperature at a certain measurement point inside the cavity during the molding process. The method provided herein may accurately reflect the temperature evolution process under different process conditions. It has great potential of promotion in industrial application and experimental research, and it is of great significance to theoretical researches such as crystallization process and shearing heating.

Different from other prior research methods, the present disclosure proposes a direct measurement method of melt temperature inside the mold cavity for the first time, and mainly focus on the measurement of non-isothermal melt temperature inside the mold during the molding process instead of the isothermal temperature of molten melt inside the material canister of the injection machine. In the present disclosure, two kinds of physical information, sound velocity and pressure, are utilized in a comprehensive manner, and a physical model among the sound velocity, the pressure and the temperature is originally proposed. This method may realize not only the measurement of melt temperature at a low cost, but further the on-line measurement of melt density through the "pressure-density-temperature" correlation model of a material, thus facilitating the on-line quality control of molded products.

Measurement Principle

According to an ultrasonic echo waveform measured by the ultrasonic probe, the ultrasonic transmission velocity c in the melt may be calculated as follows:

$$c = \frac{2d}{\Delta t} \quad (3)$$

Wherein d is the thickness of the mold cavity at the measurement point, and $\Delta t$ is the echo time difference of ultrasonic on two different surfaces of the melt. At the same time, the melt pressure P at the measurement point may be directly measured by the pressure sensor inside the mold. Further, the ultrasonic sound velocity c and pressure P may be analyzed and deduced.

According to the theory of ultrasonic transmission, under a specific temperature and pressure, the relation between the bulk elastic modulus and the density of polymer melt and the sound velocity is:

$$\rho_m c^2 = K_m \quad (4)$$

In the formula, $\rho_m$ is the density of the polymer melt. Melt $K_m$ is the bulk elastic modulus of polymer melt, and c is the ultrasonic sound velocity; in addition, the relation between the bulk elastic modulus of the polymer melt and the pressure that the polymer melt is subjected to the equation:

$$P = K_m \frac{\Delta V}{V_0} \quad (5)$$

In the formula, P is the pressure that the polymer melt is subjected to.

Assuming that the polymer melt with an initial density of $\rho_0$ has a mass of $m_0$, wherein $\rho_0$ may be expressed as:

$$\rho_0 = \frac{m_0}{V_0} \quad (6)$$

An initial volume of the melt is $V_0$, and $\Delta V$ is the volume compression amount of the polymer melt. When the melt is subjected to the pressure P, the density $\rho_m$ of the polymer melt is:

$$\rho_m = \frac{m_0}{V_0 - \Delta V} \quad (7)$$

Combining formulas (5) to (7), we get:

$$\rho_m = \frac{\rho_0}{1 - \frac{P}{K_m}} \quad (8)$$

Combining formulas (4) and (8), we get:

$$P = c^2(\rho_m - \rho_0) \quad (9)$$

It should be noted that the above model formula is satisfied in the premise that the polymer melt is under a same temperature, which means, the pressure P, sound velocity c and density $\rho_m$ of the polymer melt satisfy the expression of formula (9) under a certain temperature. Under this temperature, $\rho_0$, as a standard value, is the density when the pressure is the gauge pressure (1 standard atmospheric pressure). During actual measurement, $\rho_0$ varies with the temperature, which is not a fixed constant. When $\rho_0$ and $\rho_m$ are both variables changing at the same time, the melt density or temperature may not be calculated through direct measurement of P and c.

According to the present disclosure, formula (9) is further transformed by means of a correlation equation of polymer "pressure-density-temperature", i.e., a PVT characteristic equation. The PVT characteristic equation of polymer belongs to the inherent attribute of polymer. For a specific polymer in any states, its specific volume V (i.e., the reciprocal of density) always corresponds to its intensity of pressure P and temperature T to a certain extent.

The PVT equation has two main expression forms, namely Tait equation and Spencer equation, wherein the Tait state equation is relatively higher in precision. The Tait state equation is used as a tool to calculate the density of materials. The Tait equation may be expressed as:

$$V(T, P) = V_0(T)\left\{1 - C\ln\left[1 + \frac{P}{B(T)}\right]\right\} + V_1(T, P) \quad (10)$$

When the polymer is in a solid state, and $T < b_5 + b_6 P$, $$\begin{cases} V_0 = b_{1s} + b_{2s}(T - b_5) \\ B(T) = b_{3s} e^{[-b_{4s}(T - b_5)]} \\ V_1 = b_{7} e^{[b_8(T - b_5) - b_9 P]} \end{cases} \quad (11)$$

When the polymer is in a molten state, and $T > b_5 + b_6 P$, $$\begin{cases} V_0 = b_{1m} + b_{2m}(T - b_5) \\ B(T) = b_{3m} e^{[-b_{4m}(T - b_5)]} \\ V_1 = 0 \end{cases} \quad (12)$$

Here in equations (10), (11), and (12), all other parameters except T, P and V are constant coefficients of the equation direct corresponding to specific polymer materials, specific values of which may be obtained through experiments or literature search.

When the polymer is melt in the injection molding process, it always satisfies the condition $T > b_5 + b_6 P$. Therefore, the densities $\rho_m$ and $\rho_0$ of the melt may be expressed as:

$$\rho_m = f(T, P) = \frac{1}{V_m(T, P)} \frac{1}{[b_{1m} + b_{2m}(T - b_5)]\left\{1 - C\ln\left[1 + \frac{P}{b_{3m} e^{[-b_{4m}(T - b_5)]}}\right]\right\}} \quad (13)$$

$$\rho_0 = f(T, P_0) = \frac{1}{V_0(T, P_0)} \frac{1}{[b_{1m} + b_{2m}(T - b_5)]\left\{1 - C\ln\left[1 + \frac{P_0}{b_{3m} e^{[-b_{4m}(T - b_5)]}}\right]\right\}} \quad (14)$$

In the above formula, T and P are the temperature and pressure at a certain time, and $P_0$ is 1 standard atmospheric pressure, i.e., 0.1 MPa. Formulas (13) and (14) are substituted into formula (9), so that:

$$P = c^2(f(T, P) - f(T, P_0)) \quad (1)$$

During the calculation, P, c, and $P_0$ are all known numbers, and theoretically the real-time measurement of melt temperature may be realized through the solution of equation (1).

In actual on-line measurement, the ultrasonic probe is mounted on the backside of the front cavity of the injection mold, and two surfaces to be measure are connected together by an ultrasonic detection couplant. The ultrasonic probe is mounted and fixed in the injection mold by means of a certain external force (such as a mechanical spring) and mechanical position limiting. Similarly, the pressure sensor, which adopts contact measurement, is mounted into a mounting hole on the rear mold side of the injection mold to measure a surface coplanar with a cavity surface. An ultrasonic detection cable is connected with ultrasonic probe at one end, and connected with an ultrasonic acquisition card at the other end; a pressure sensor cable is connected with the sensor at one end, and connected with a data acquisition system at the other end. The equipment is powered on, debugged, and detected until ultrasonic echo signals and stable pressure signals can be observed and recorded continuously.

The mounted injection mold is installed onto the injection molding machine, add pre-dried raw materials for injection are added into the hopper of the injection molding machine. A plasticizing temperature is set for the screw, so that when the temperature reaches the set value, a motor of the injection molding machine is turned on. Appropriate process parameters such as injection pressure holding and cooling parameters. After several cycles of injection, the system turns to stable, and the injection molding process may start then. Firstly, acquisition and recording commands are enabled for ultrasonic and pressure sensors, then the injection molding machine closes the mold, injects, holds the pressure, cools down, stores the material, opens the mold, and ejects the product. After that, the equipment stops signal acquisition, locally saves the signals recorded for one batch for further analysis and processing, and then proceeds with the next production and measurement cycle. At last, the obtained signal data are processed to obtain variation curves of the ultrasonic sound velocity and the melt pressure in each batch process. The sound velocity c and pressure P measured in real time are substituted into formula (2), and the temperature T is iteratively obtained by the iterative method of formula (2'), so as to obtain melt temperature data at the measurement points. Finally, through data integration, the temperature variation is obtained for the polymer melt on the ultrasonic transmission path in the molding process.

Across the entire process, process parameters in the production process may be adjusted, such as the plasticizing temperature, injection pressure, and holding pressure, which will affect the variation of melt temperature in the molding process and the performance of the final product; and on-line measurement can be enabled by the method proposed by the present disclosure.

Based on the method proposed by the present disclosure, on-line and in-situ characterization may be enabled for the melt density through the PVT equation deduction and by using the apparatus and model together, thereby realizing on-line quantitative measurement of the melt quality. Compared with infrared measurement methods, the method provided herein is significantly reduced in cost, which is of great significance to theoretical researches of crystallization process and shear heating.

DETAILED DESCRIPTION

Figure 1:
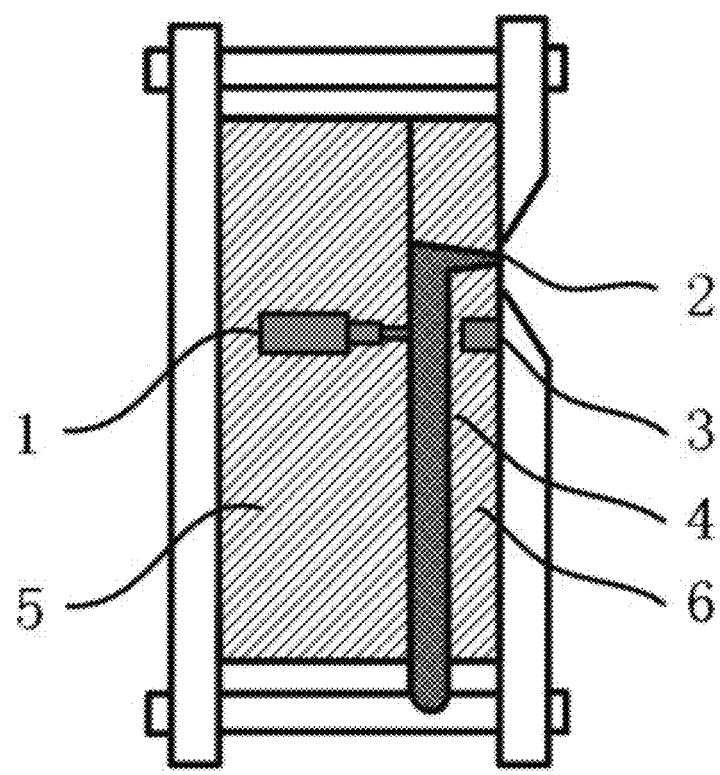
FIG. 1 is a structure schematic view of a verification apparatus used in the laboratory according to the present disclosure.
Figure 2:
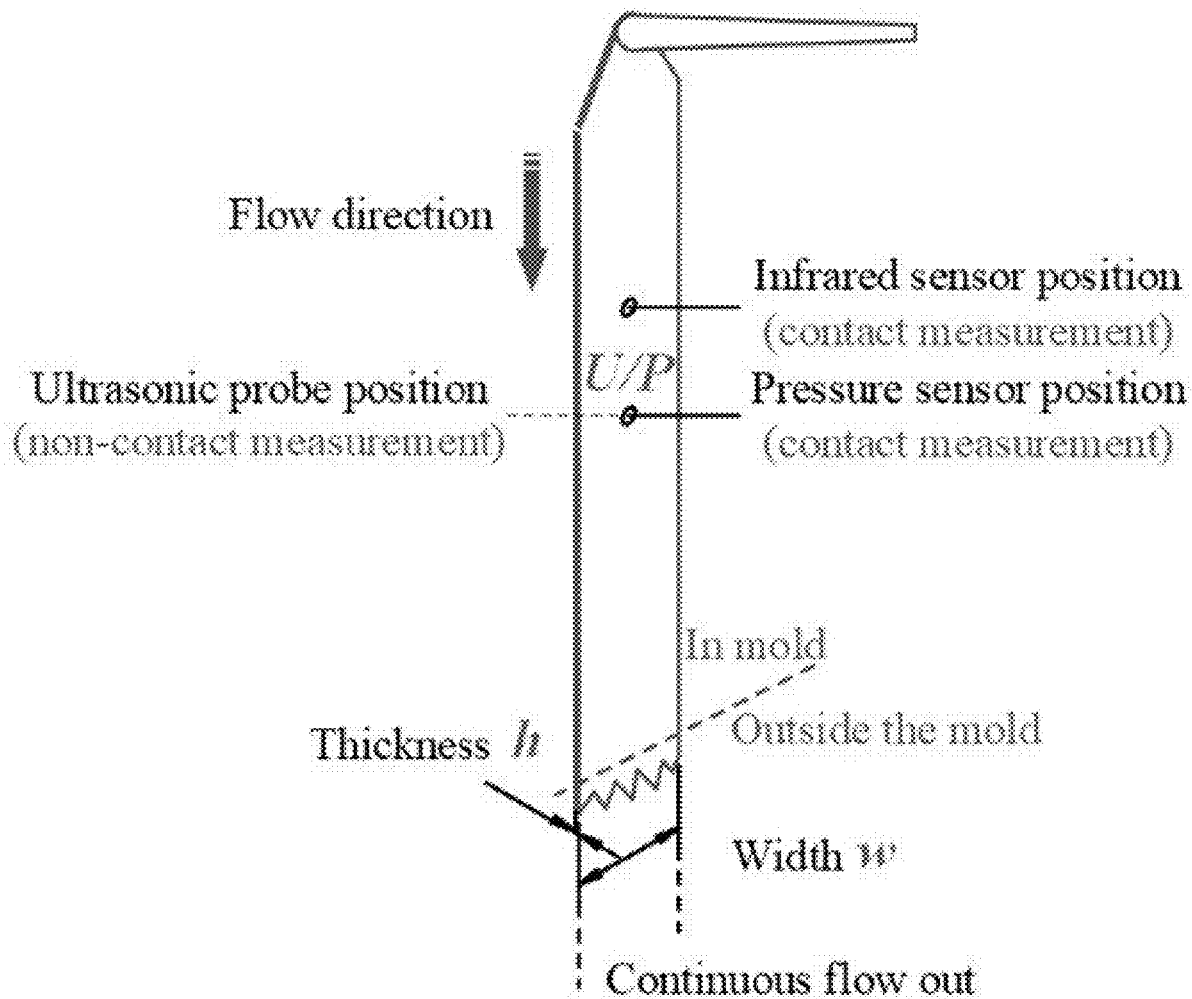
FIG. 2 is a schematic view of a mounting position of the cavity pressure sensor used in the example and of the cavity shape.

The mold used in this embodiment adopts direct plastic feeding, and the schematic diagram of the measurement apparatus (experimental mold) is as shown in FIG. 1, wherein 5 and 6 represent a rear mold and a front mold of the mold respectively, and 2 is the plastic inlet of polymer melt, through which the melt enters a mold cavity 4, and flows, cools down inside the cavity and cures into a final product. In the drawing, 1 and 3 represent a melt pressure sensor and an ultrasonic probe respectively, wherein the ultrasonic probe works by non-contact measurement, so it keeps a certain distance from the cavity. Specifically, the cavity in the experimental mold is of a sheet structure with a length of 200 mm, a width of 30 mm and a thickness of 2 mm. The mounting position of the cavity pressure sensor used in the embodiment and the cavity shape are as shown in FIG. 2. The ultrasonic probe contacts the mold surface by using the couplant, and the other end of the probe is pressed tightly against and fixed onto the inside of the mold by mechanical means and a spring. The pressure sensor, which adopts contact measurement, is mounted into a mounting hole on the rear mold side of the injection mold to measure a surface coplanar with a cavity surface. An ultrasonic detection cable is connected with ultrasonic probe at one end, and connected with an ultrasonic acquisition card at the other end; a pressure sensor cable is connected with the sensor at one end, and connected with a data acquisition system at the other end. The equipment is powered on, debugged, and detected until ultrasonic echo signals and stable pressure signals can be observed and recorded continuously. In the experiment, the ultrasonic acquisition card in use has a sampling frequency of 250 MHz, the signal preservation rate is 100 Sa/s, which means 100 echo waveforms are preserved per second.

The mounted injection mold is installed onto the injection molding machine. Pre-dried raw materials for injection are added into the hopper of the injection molding machine. A plasticizing temperature is set for the screw, so that when the temperature reaches the set value, a motor of the injection molding machine is turned on. Appropriate process parameters such as injection pressure holding and cooling parameters. After several cycles of injection, the system turns to stable, and the injection molding process may start then. Firstly, acquisition and recording commands are enabled for ultrasonic and pressure sensors, then the injection molding machine closes the mold, injects, holds the pressure, cools down, stores the material, opens the mold, and ejects the product. After that, the equipment stops signal acquisition, locally saves the signals recorded for one batch for further analysis and processing, and then proceeds with the next production and measurement cycle. At last, the obtained signal data are processed, so that the ultrasonic sound velocity c can be calculated by recording the time difference between the transmitted ultrasonic and the ultrasonic echo as well as the cavity thickness, and the pressure P can be directly measured by the pressure sensor. The melt temperature can be obtained by formula (2) and iterative formula (2').

In order to verify the accuracy of the measurement method proposed in the present disclosure, we compare the experimental results obtained by this method with those measured by an infrared optic-fiber sensor under the same condition.

Figure 3:
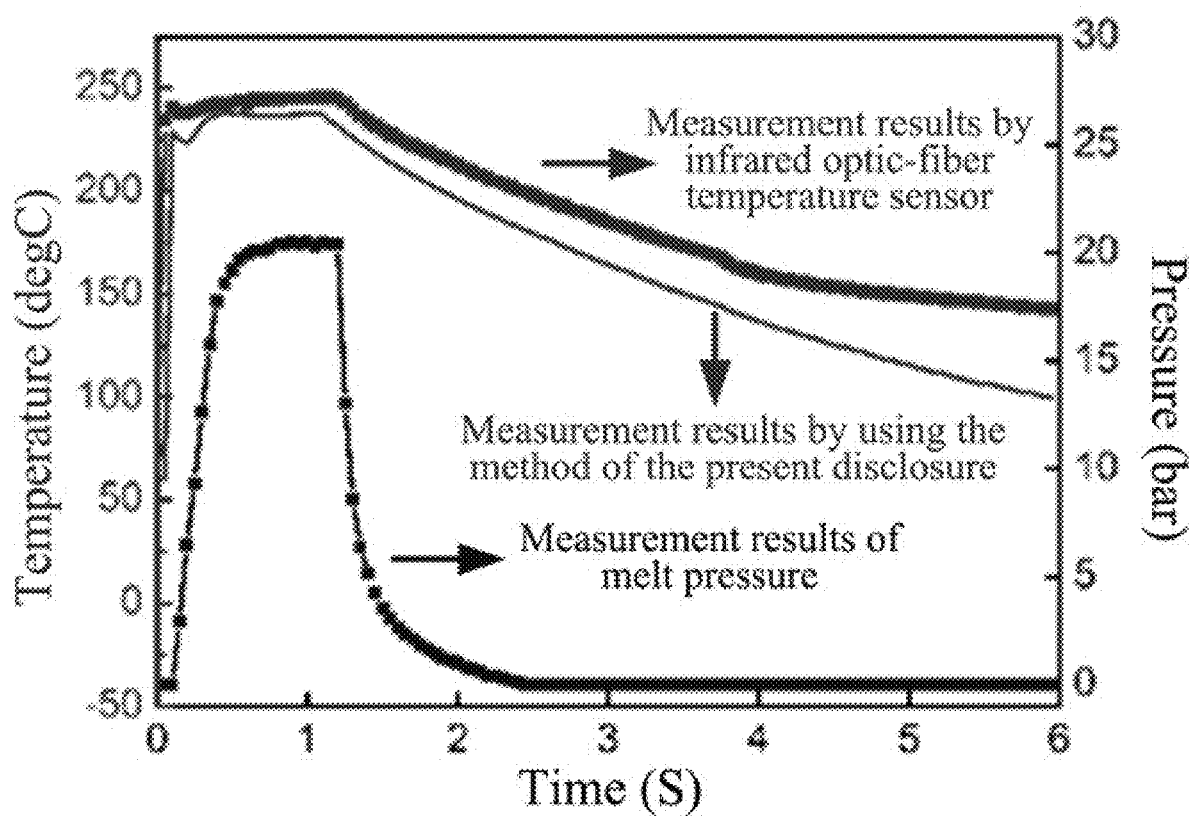
FIG. 3 shows temperature variation curves measured by an infrared optic-fiber temperature sensor in a certain injection molding process, and temperature variation curves measured by this method.

FIG. 3 shows temperature variation curves measured by an infrared optic-fiber temperature sensor in a certain injection molding process, and temperature variation curves measured by this method. It can be seen that both of the results hold good consistency in terms of absolute values and change trends, indicating that the method proposed in the present disclosure may replace the infrared method and enable accurate and rapid measurement of melt temperature at a low cost.

We selected several groups of data under different process parameters to verify the method. Experimental results are as shown in Table 1.

TABLE 1

| Group | FIR temperature sensor measurement results | Pressure sensor measurement results | Ultrasonic sound velocity measurement results | Melt temperature calculation results | Measurement errors |
|---|---|---|---|---|---|
| 1 | 244.40° C. | 19.67 MPa | 995.61 m/s | 251.05° C. | 2.72% |
| 2 | 238.14° C. | 19.72 MPa | 1038.01 m/s | 225.36° C. | 5.36% |
| 3 | 245.82° C. | 20.33 MPa | 1020.31 m/s | 236.87° C. | 3.64% |

Figure 4:
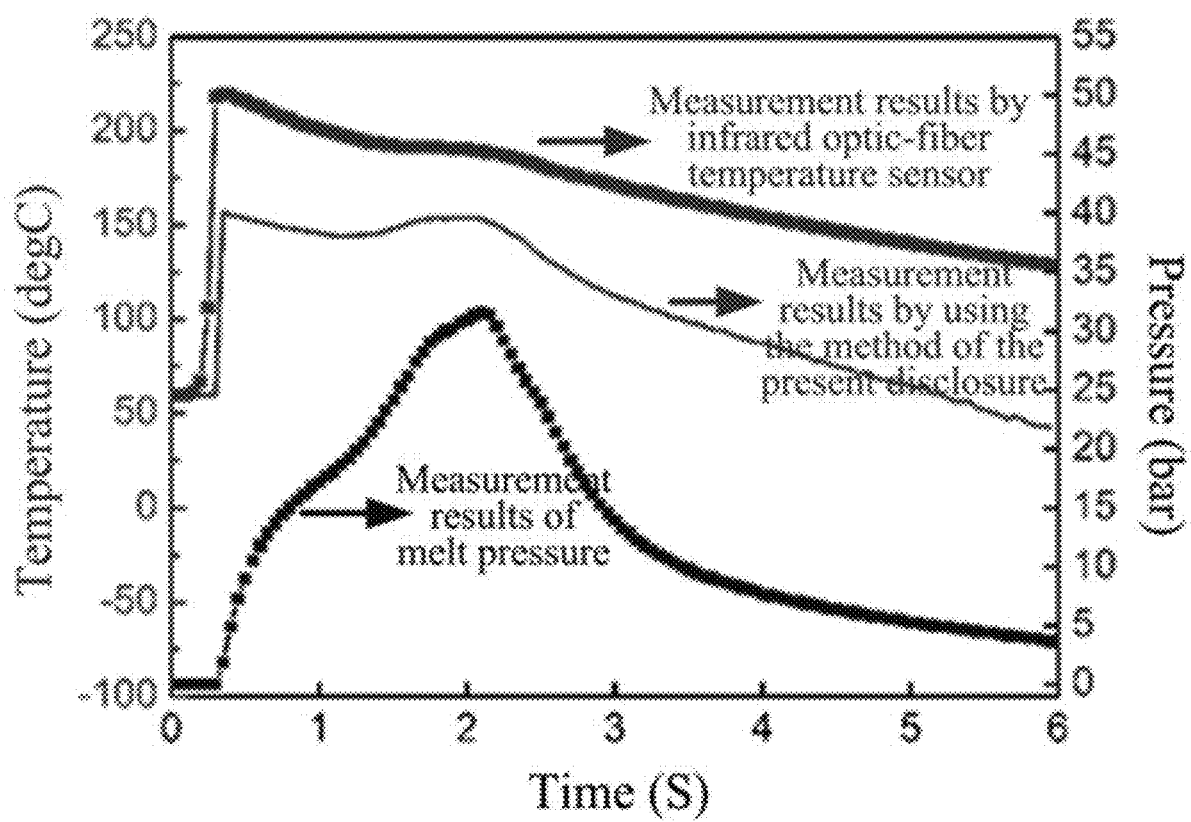
FIG. 4 shows the measurement results of this method and infrared measurement method across the process of filling, pressure holding and cooling down phases in the injection process.

In addition, FIG. 4 shows the measurement results of this method and infrared measurement method across the process of filling, pressure holding and cooling down phases in the injection process. Because the temperature is affected by various molding parameters, this method may realize on-line detection and diagnosis of a variety of parameters that affect the final product quality, such as the injection speed and holding pressure.

What is claimed is:

1. A method for on-line measurement of polymer melt temperature, comprising:

measuring, by an ultrasonic probe, ultrasonic sound velocity c of melt during injection molding on line;

measuring, by a pressure sensor, melt pressure P during injection molding on line, wherein the ultrasonic probe and the pressure sensor are arranged at a same cross section of the melt, wherein a sampling frequency of pressure or ultrasonic is higher than 250 MHz, and a signal preservation rate is higher than 20Sa/s, wherein an end of the ultrasonic probe fits and contacts a surface to be measured of a front mold by using a couplant, and another end of the ultrasonic probe is pressed tightly against and fixed onto inside of the mold, and wherein the pressure sensor is mounted into a mounting hole on a rear mold to measure a surface coplanar with a cavity surface; and calculating, by a microprocessor, melt temperature T during injection molding by using a Newtonian-iterative numerical method according to a formula (1) as follows, and controlling, by the microprocessor, on-line quality of a molded product based on the melt temperature:

$$P = c^2(f(T,P) - f(T,P_0)) \quad (1)$$

wherein f (T, P) and f (T, $P_0$) are respectively:

$$f(T, P) = \frac{1}{[b_{1m} + b_{2m}(T - b_5)]\left\{1 - C\ln\left[1 + \frac{P}{b_{3m}e^{[-b_{4m}(T-b_5)]}}\right]\right\}}$$

$$f(T, P_0) = \frac{1}{[b_{1m} + b_{2m}(T - b_5)]\left\{1 - C\ln\left[1 + \frac{P_0}{b_{3m}e^{[-b_{4m}(T-b_5)]}}\right]\right\}}$$

wherein: $P_0$ is 1 standard atmospheric pressure, while C, $b_{1m}$, $b_{2m}$, $b_{3m}$, $b_{4m}$, and $b_5$ are constant coefficients.

2. The method for on-line measurement of the polymer melt temperature according to claim 1, wherein a number of iteration times is set to 4-10.

3. An apparatus for on-line measurement of the polymer melt temperature, comprising:

an ultrasonic probe, configured to perform on-line measurement of ultrasonic sound velocity c of melt during the injection molding process;

a pressure sensor, configured to perform on-line measurement of pressure P of the melt during the injection molding process, wherein the ultrasonic probe and the pressure sensor are arranged at a same cross section of the melt, wherein a sampling frequency of pressure or ultrasonic is higher than 250 MHz, and wherein a signal preservation rate is higher than 20Sa/s, wherein an end of the ultrasonic probe fits and contacts a surface to be measured of a front mold by using a couplant, and another end of the ultrasonic probe is pressed tightly against and fixed onto inside of the mold, and wherein the pressure sensor is mounted into a mounting hole on a rear mold to measure a surface coplanar with a cavity surface; and a microprocessor configured to receive signals from the ultrasonic probe and the pressure sensor to output numeral values of the ultrasonic sound velocity c and the pressure P, obtain the polymer melt temperature T according to a formula: $P = c^2(f(T, P_0) - f(T, P_0))$, and control on-line quality of a molded product based on the polymer melt temperature; wherein f (T, P) and f (T, $P_0$) are respectively:

$$f(T, P) = \frac{1}{[b_{1m} + b_{2m}(T - b_5)]\left\{1 - C\ln\left[1 + \frac{P}{b_{3m}e^{[-b_{4m}(T-b_5)]}}\right]\right\}}$$

$$f(T, P_0) = \frac{1}{[b_{1m} + b_{2m}(T - b_5)]\left\{1 - C\ln\left[1 + \frac{P_0}{b_{3m}e^{[-b_{4m}(T-b_5)]}}\right]\right\}}$$

wherein: $P_0$ is 1 standard atmospheric pressure, while C, $b_{1m}$, $b_{2m}$, $b_{3m}$, $b_{4m}$, and $b_5$ are constant coefficients.

4. The apparatus of on-line measurement of the polymer melt temperature according to claim 3, wherein the ultrasonic probe and the pressure sensor are arranged at a same cross section of the melt.

5. The apparatus of on-line measurement of the polymer melt temperature according to claim 3, wherein a plurality of sets of ultrasonic probes and pressure sensors are arranged along a direction that the melt flows in, so as to measure a melt temperature distribution across a cavity on-line.

6. The apparatus of on-line measurement of the polymer melt temperature according to claim 3, wherein a high-temperature ultrasonic couplant is selected as the couplant.

* * * * *